United States Patent [19]

Pace et al.

[11] Patent Number: 5,096,405

[45] Date of Patent: Mar. 17, 1992

[54] POWERED MOUNTS FOR QUICKLY MOUNTING MOLD PARTS ON MOLDING MACHINE PLATENS

[75] Inventors: Paul G. Pace, North Hollywood; Paul G. Sloane, Leona Valley, both of Calif.

[73] Assignee: American Aerostar Corporation, Sylmar, Calif.

[21] Appl. No.: 584,942

[22] Filed: Sep. 18, 1990

[51] Int. Cl.⁵ .............................................. B29C 45/67
[52] U.S. Cl. ................................. 425/192 R; 425/542; 425/589
[58] Field of Search .................... 425/192 R, 542, 589; 249/219.1; 248/637, 654

[56] References Cited

U.S. PATENT DOCUMENTS

| | | | |
|---|---|---|---|
| 4,484,880 | 11/1984 | Schwarz | 425/192 R |
| 4,544,340 | 10/1985 | Hehl | 425/589 X |
| 4,790,739 | 12/1988 | Manfredi | 425/192 R |
| 4,867,668 | 9/1989 | Miyairi | 425/192 R |

Primary Examiner—Richard L. Chiesa
Attorney, Agent, or Firm—Donald D. Mon

[57] ABSTRACT

A mounting plate attachable to a molding machine platen has a plurality of retention slots. A plurality of hydraulically-actuated clamps have heads in respective retention slots. Each clamp includes a piston and a cylinder, and a clamping ring adjustably positionable along the cylinder. Actuation of the clamp causes a mold part to be pressed toward the platen to hold it in an adjusted position.

6 Claims, 4 Drawing Sheets

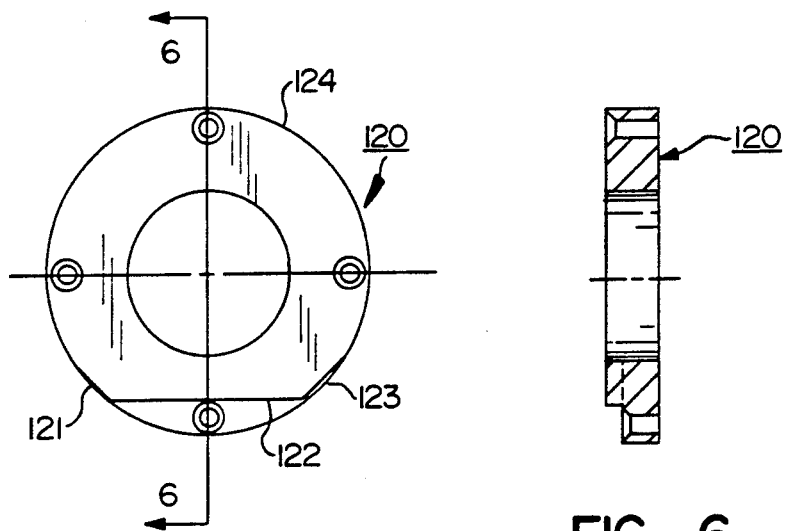
FIG. 5
FIG. 6
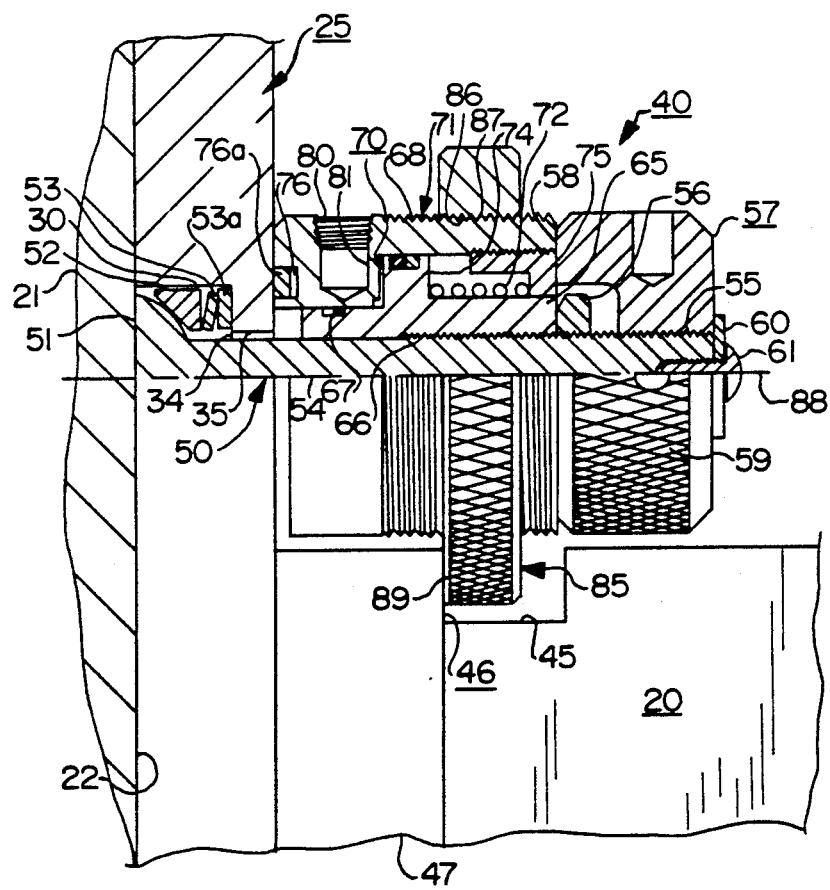
FIG. 7

5,096,405

POWERED MOUNTS FOR QUICKLY MOUNTING MOLD PARTS ON MOLDING MACHINE PLATENS

FIELD OF THE INVENTION

This invention relates to the mounting of mold parts to the platens of molding machines.

BACKGROUND OF THE INVENTION

A molding machine supports the parts of a separable mold on the faces of its platens. The platens are powered to move the mold parts toward and away from one another to close the mold and to open it. When closed, plastic is injected into the mold cavities to form a product. The product is removed when the platens pull the mold parts apart from one another.

When different parts are to be run from time to time on a molding machine, the mold parts must be changed. In such circumstances, one mold set will be removed and another will be put in place on the platens. Often these molds are of different sizes.

In whatever event, these heavy mold parts must be mounted to the platens and located very precisely relative to one another. The manipulation into place, and the bolting down of the mold parts is inconvenient, troublesome and time-consuming.

In the quick mold change art as known prior to this invention it was necessary to equip, attach, or otherwise provide each mold part with a uniform size and configuration with which the quick changing device interfaces. The attachments to the mold involved one set of problems, and their mounting to the platens involved yet another set of problems.

It is an object of this invention to enable the use of non-uniform mounting means conveniently sized to the respective mold part, and which can readily be mounted to a universally adaptable mounting plate by powered clamps, quickly and easily.

BRIEF DESCRIPTION OF THE INVENTION

This invention comprehends a hydraulically-actuated clamp intended to clamp onto shoulder means on a mold part. In one embodiment, the platen is fitted with a mounting plate to which the clamps are attached. The mounting plate is provided with slots which enable clamps carried in the slot to be moved to accommodate themselves to shoulder means on the mold.

In another embodiment, the clamp includes a base attached to the platen directly or through a mounting plate, which base includes roller means that enable the mold readily to be moved for a conveyance or adjustment purposes.

According to an optional feature of the invention, a locator means is provided which includes a locator ring in one part, and a locator plug on the other which join to center the mold parts relative to the molding machine. Preferably but optionally these can include an axially-extending cradle to provide location and rotational guidance.

The above and other features of this invention will be fully understood from the following detailed description and the accompanying drawings, in which:

BRIEF DESCRIPTION OF THE DRAWINGS

FIG. 5 is an end view of a locator plug to be fitted to the locator ring shown in FIG. 3;

FIG. 6 is a cross-section taken at line 6—6 in FIG. 5;

FIG. 7 is a side view, partly in cutaway cross-section, of a clamp shown in FIG. 1;

DETAILED DESCRIPTION OF THE PREFERRED EMBODIMENTS

Figure 1:
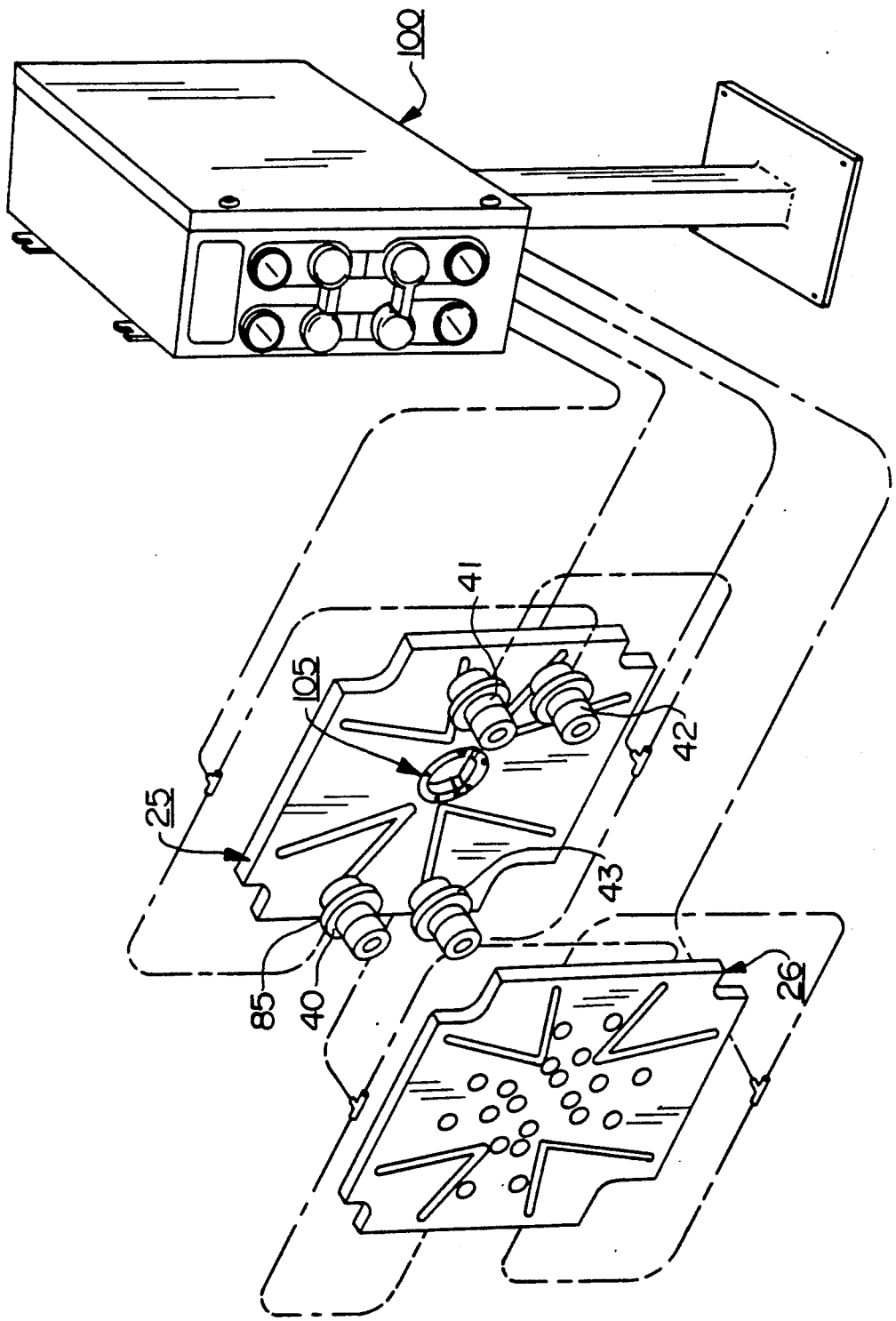
FIG. 1 is a semi-schematic perspective showing of the preferred embodiment of mounting system of this invention.
Figure 2:
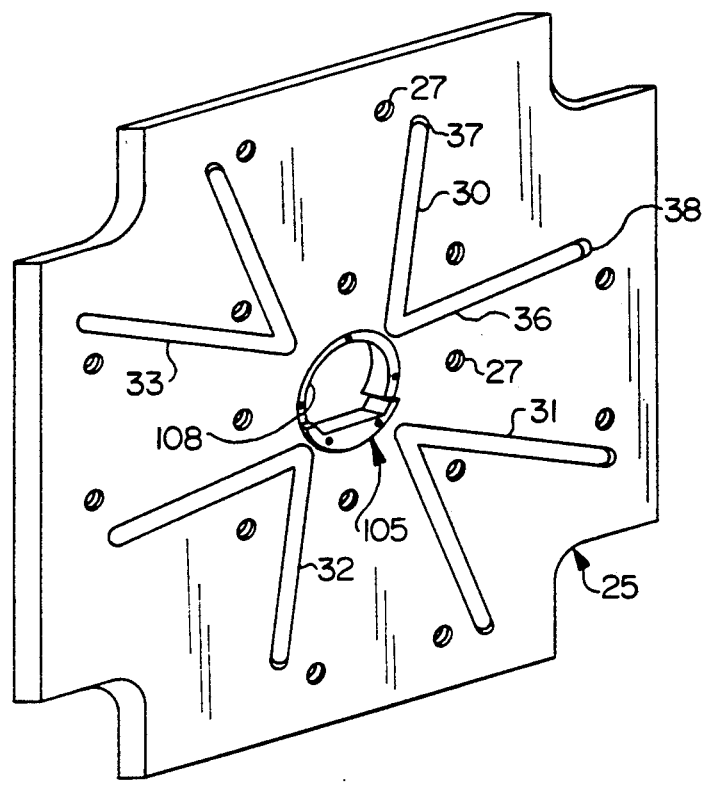
FIG. 2 is an enlarged view of a mounting plate shown in FIG. 1.

As best shown in FIG. 7, the objective of this invention is to mount a mold part 20 to a platen 21. The platen has a face 22, which faces toward an opposite platen. The opposite platen has similar means to mount another mold part (not shown). One or both platens are moved along the horizontal axis of FIG. 7 to open and to close the mold.

These mold parts frequently weight hundreds of pounds. Conventional practice is to suspend them from chain hoists, and then jockey them into place, where they are then fixed to the platen by wrench-tightened bolts, or if the clamps are powered then to require uniform attachment means. These can be arduous time-consuming, unpredictable, and generally costly. Furthermore they require that the mold be provided with mounting means respective to a specific machine. As a consequence, there is a frequent requirement to modify a mold to suit a specific mounting means. These introduce undesirable elements of delay, expense, and precision which this invention overcomes.

A universal mounting plate 25, 26 may be provided for each of the platens. Bolt holes 27 are provided to pass headed bolts (not shown) which fix the plates to the respective platen. Because plates 25 and 26 are nearly identical, only plate 25 will be described in detail.

In order to accommodate molds of different sizes and configurations, T-slots 30,32,32, and 33 are provided. These slots are recessed in the side away from the mold (see FIG. 7) to provide a track 34 with an overhanging retention flange 35. Each slot is open-armed in a "V" or "U" type or similar configuration and is continuous from the extreme horizontal position to the extreme vertical position and continuous from a central portion 36 through arms 37,38. The slots extend obliquely along the X and Z axes, so that a clamp in each slot can be located to be set in a wide variety of locations. For this reason, the mounting plate is referred to as "universal".

A plurality of clamps usually four, 40,41,42, and 43 are provided. These clamps are shown in FIG. 1, in mounting plate 25. A similar set of clamps will be provided on mounting plate 26. Their function is to be located along a respective slot where they will hold the mold in place. All of he clamps are identical, so only clamp 40 will be described in detail.

As best shown in FIG. 7, mold part 20 has an edge recess 45 with a bearing face 46. If desired, this recess with its face can be formed completely in the material of the mold, or added by mechanical means either permanently or temporarily attached. Usually it will be preferred to provide a shoulder plate 47, fixed to its mold part to form bearing face 46, and complete the recess. Bearing face 46, however formed, is sometimes referred to as "shoulder means".

Clamp 40 includes a retention bolt 50 with a ball-type head 51. The head bears against a circular seat ring 52 which in turn bears against a compression spring washer 53 and may include a standard washer 55a that rests against retention flange 35. Bolt 50 has a shaft with a known diameter 54 that freely passes through the slot, and a thread 55 at its unheaded end. Under axial force the compression spring washer 53 is compressed and the bolt 50 is stretched as calculated by the known shaft diameter 54, thus, storing surplus energy to be used to maintain clamping force on mold parts in case of hydraulic pressure release.

A jam nut 56 is threaded onto the thread. A safety nut 57 is also threaded onto the thread. Nut 57 has a lock face 58, a knurled exterior 59, and is restrained from loss by a washer 60 held to the bolt by screw 61. Screw 61 is preferably safetied, such as by an application of "Loctite" adhesive.

The clamp further includes a piston 65 with an internal thread 66 threaded onto the bolt. Jam nut 56 prevents the piston from creeping along the thread on the bolt. The piston includes a pair of O-ring seals 67,68, and forms a chamber 70 with a cylinder member 71. A retraction spring 72 is in compression between shoulder 74 and an insert 75 that forms part of the cylinder member.

A ring-shaped bias spring 76 friction ring 76a is seated in a groove in the end of the cylinder member to abut the mounting plate and to be compressed when the clamp is tightened for controlled friction when the clamp is being moved along its normal path in the T-slot.

A hydraulic port 80 enters the side of the cylinder member, and a side passage 81 connects it to the chamber. Accordingly, pressure applied in the chamber will move the cylinder member to the left in FIG. 7. Venting the pressure will enable retractor spring 72 to reverse this effect and loosen the clamp when knurled safety nut 57 is loosened.

A clamp ring 85 has an internal thread 86. Thread 86 can be threaded onto external thread 87 on the cylinder member. Thus, the location of clamp ring 85 along axis 88 of the clamp can be adjusted. Clamp ring 85 has a clamp face 89 which is intended to bear against bearing face 46. It will now be seen that the clamp ring can be adjusted to accommodate variations in thickness of mounting plates, or of the location of bearing faces 46.

Reverting to FIG. 1, and with continuing reference to FIG. 7, clamps 40 while loose can be moved in their respective slots closely to approach the edge of the mold and the clamp ring 85 to overlap surface 46. The clamp rings will e closely adjusted to achieve contact on the surface 46. Then hydraulic pressure will be applied to the clamps. They will firmly hold the mold, because their forces are very large.

Next as an optional safety feature, safety nut 57 is hand-tightened. The bolt is thereby restricted from moving in a releasing direction, even if hydraulic pressure is released.

A control panel 100 for the clamps is shown. The clamps are conveniently actuated in pairs. For this reason, four sets of conduits are shown branching to pairs of the clamps. Valves (not shown) control supply and exhaust of hydraulic fluid. Knobs and valves are shown for this purpose.

pre-assembly of he mold parts is relatively simple, because one need not be adjusted to the other mold part. However, then the entire mold must be rotated into a matching position to mate the locator ring and locator plugs, as well as being moved up, down, and sideways. The conventional practice of "eyeballing" this operation does work, but it is tedious and very inconvenient.

Figure 3:
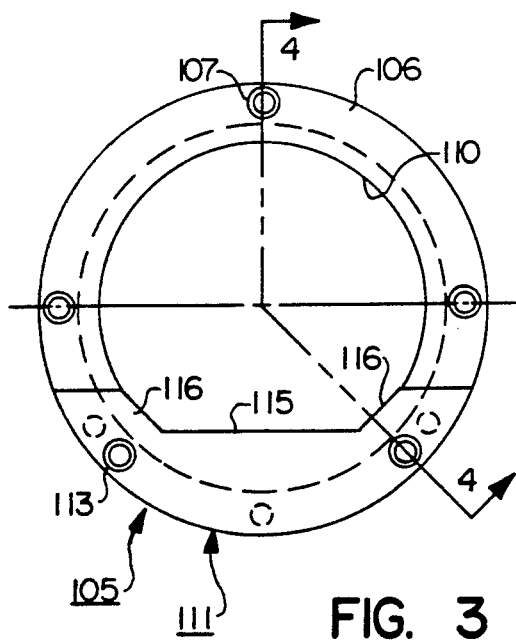
FIG. 3 is an end view of a portion of FIG. 2.
Figure 4:
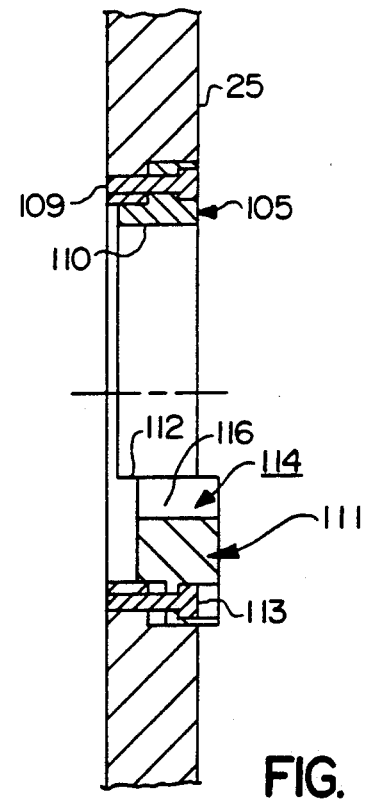
FIG. 4 is a cross-section taken at line 4—4 in FIG. 3.

To improve this situation, one mounting plate is provided with locator means 105. As best shown in FIGS. 3 and 4, it includes a locator ring 106 with bolt holes 107 that enable it to be fixed in a central opening 108 in the mounting plates by bolts 109. The locator ring has a locating surface 110 which extends around a major portion of its circumference. It is at least the fragment of a cylinder.

In order to assist the mechanic, a cradle member 111 is slidably fitted in a cut-out portion 112 of the locator ring, and restrained there by bolts 113. However, the cradle member is axially slidable, as shown in FIG. 4. It can move outwardly beyond the locator ring. It has a cradle form 114 instead of a cylindrical surface. The cradle form includes a flat base 115 and two side walls 116.

The purpose of he foregoing is to receive and to guide a locator plug 120 on the other mold part (see FIGS. 5 and 6). This plug includes surfaces 121, 122 and 123 (121 and 123 optional) which match the cradle form, and at least part of a fragment of a cylinder 124 which matches the cylinder fragment in the mounting plate.

While the cradle member is extended, the mold part with the plug can be lowered into the cradle form, which will axially and rotatably align the mold part. Moving the platens closer together will correctly mate them. Then the clamps on the mold parts are actuated and tightened.

Figure 8:
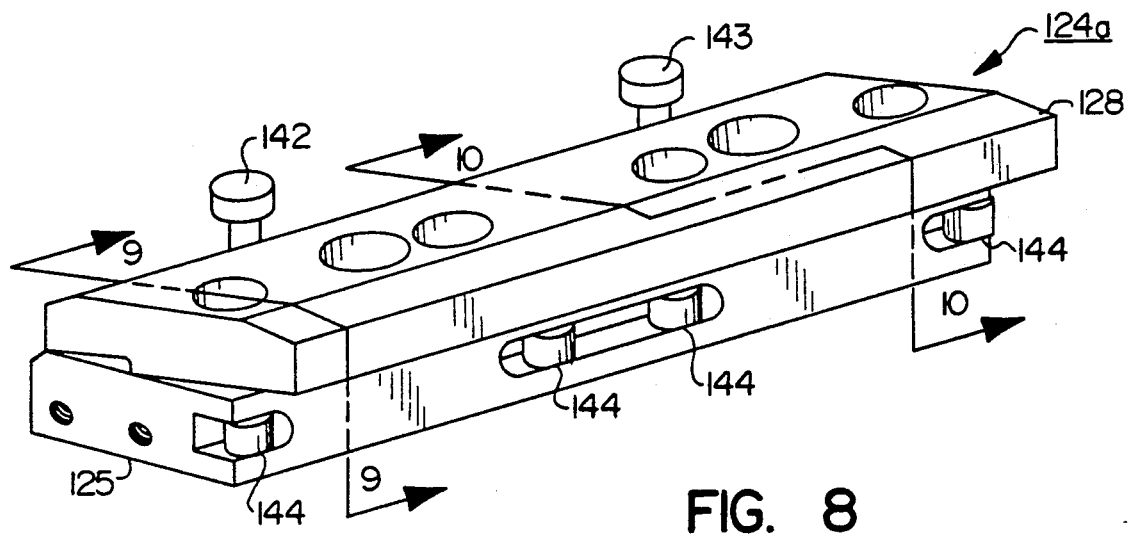
FIG. 8 is a perspective view of another embodiment of clamps useful with this invention.
Figure 9:
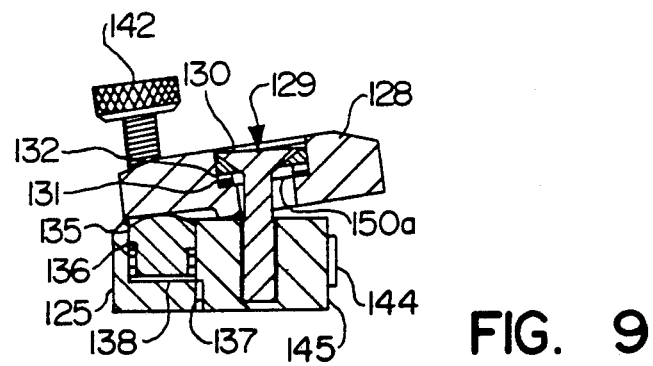
FIG. 9 is a cross-section taken at line 9—9 in FIG. 8.
Figure 10:
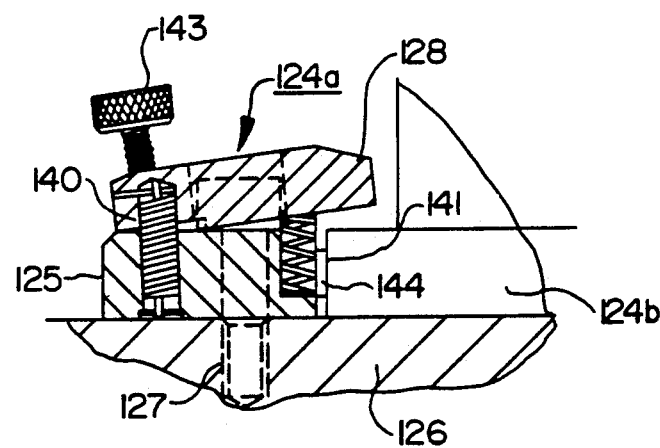
FIG. 10 is a cross-section taken at line 10—10 in FIG. 8.

Another embodiment of clamp 124a for use with a mold part 124b provided with a suitable bearing face is shown in FIGS. 8–10. This clamp is less readily adjusted in position than the clamp of FIG. 7, but has the advantage in common of hydraulic actuation, and of safetying. It has an additional advantage of means for shifting the mold part in plane.

A base 125 is mounted to platen 126 by bolts 127. Clamping bar 128 is held to the base by a rocker screw 129 threaded into the base. The rocker screw has a ball-ended head 130 which seats in a tapered seat 130a held in a counter bore 131. A compression spring 132 biases the seat toward the screw head. There is sufficient clearance for the clamping bar to clear the screw while tilting.

As best shown in FIG. 9, a piston 135 is axially movable in cylinder 136. A hydraulic port 137 admits fluid under pressure into a chamber 138 beneath the piston.

As shown in FIG. 10, a tension spring 140 pulls the back end (left hand end in FIG. 10) of the clamping arm down. A compression spring 141 biases the other end up. Safety screws 142,143 can be tightened down to maintain the clamp in its clamped condition after it is hydraulically clamped, even if hydraulic pressure is relieved. In addition, the resulting tension in rocker screws 129 and spring washers 132 tend to maintain the clamp in its closed condition.

A plurality of rollers 144 are journaled in the base and project beyond a face 145 on the base. These can bear against an edge of the mold or of its mounting plate, and enable the mold readily to be moved along that face, on its own plane.

Hydraulic controls similar to those shown in FIG. 1 can be provided as appropriate.

This invention provides clamp means and clamping systems which greatly simplify the mounting of mold parts to platens.

This invention is not to be limited by the embodiments shown in the drawings and described in the description, which are given by way of example and not of limitation, but only in accordance with the scope of the appended claims.

I claim:

1. In combination:
   a mounting plate attachable to a molding machine platen, said mounting plate having a plurality of retention slots; and
   a plurality of hydraulically-actuated clamps, each said clamp having a clamping bolt with a head engageable in said slot, a shaft projecting beyond said mounting plate, a piston fixed to said shaft, a cylinder member fitted on said piston forming a chamber between them, whereby exertion of hydraulic pressure in said chamber forces the cylinder member toward one side of said mounting plate and pulls the head of the clamping bolt toward the other side of said mounting plate, an external thread on said cylinder member, and a clamping ring threaded to said thread on said cylinder member thereby to be adjustably positionable along said cylinder member,
   whereby shoulder means on a mold part may be engaged by said clamp ring to press the mold part toward the platen when hydraulic pressure is applied in said chamber.

2. A combination according to claim 1 in which a safety nut is also threaded to said thread on the clamping bolt so as to be brought to bear against the cylinder member when the clamp is actuated, thereby to prevent the clamp from loosening in the event of pressure release.

3. A combination according to claim 1 in which said slots are provided in open-armed patterns as to enable the clamps to be shifted into a wide range of locations along the surface of the mounting plate.

4. A combination according to claim 1 in which the mounting plate includes a locator ring having at least a fragment of an internal cylinder to form a self-leveling socket, and in which a locator plus having at least the fragment of an external cylinder is mounted to the other said mold part to assist in positioning the mold parts relative tot he molding machine upon engagement with said locator ring.

5. A combination according to claim 4 in which said locator ring includes a cradle form, and said plug includes a complementary form to fit therewith to assist in the rotational alignment of the mold parts.

6. A combination according to claim 5 in which said cradle form is axially shiftable relative to the mounting plate.

* * * * *